United States Patent [19]

Minnebraker et al.

[11] Patent Number: 4,570,756
[45] Date of Patent: Feb. 18, 1986

[54] BRAKE DEVICE FOR WHEELCHAIRS

[75] Inventors: Jeffrey P. Minnebraker, Van Nuys; George E. Linder, Pacific Palisades, both of Calif.

[73] Assignee: Quadra Wheelchairs, Inc., Westlake Village, Calif.

[21] Appl. No.: 537,943

[22] Filed: Sep. 30, 1983

[51] Int. Cl.$^4$ ................................................ B60T 1/04
[52] U.S. Cl. ........................................ 188/2 F; 188/74; 280/242 WC; 280/289 WC; 297/DIG. 4
[58] Field of Search ........................... 188/2 F, 20, 24; 280/242 WC, 289 WC, 647; 297/DIG. 4

[56] References Cited

U.S. PATENT DOCUMENTS

| | | | |
|---|---|---|---|
| 930,044 | 8/1909 | Collier | 188/20 X |
| 2,254,632 | 9/1941 | Teska | 188/20 |
| 2,534,539 | 12/1950 | Topper | 188/20 X |
| 3,556,260 | 1/1971 | Meyer | 188/24 |
| 3,877,725 | 4/1975 | Borroza | 280/242 WC |
| 4,019,752 | 4/1977 | Leon et al. | 188/2 F X |
| 4,280,595 | 7/1981 | Timms et al. | 188/69 X |
| 4,350,227 | 9/1982 | Knoche | 280/242 WC X |
| 4,360,213 | 11/1982 | Rudwick et al. | 280/242 WC |

FOREIGN PATENT DOCUMENTS

| | | | |
|---|---|---|---|
| 2532485 | 2/1977 | Fed. Rep. of Germany | 188/2 F |
| 270045 | 5/1927 | United Kingdom | 188/20 |

Primary Examiner—George E. A. Halvosa
Attorney, Agent, or Firm—Robert J. Schaap

[57] ABSTRACT

A brake device for use with wheelchairs of the type having a main frame and a pair of spaced apart large diameter driving wheels, such as rear wheels. The brake device comprises a bracket or other mounting element for mounting to the wheelchair frame and a lever arm which is shiftable to a wheel locking position to move a brake tab into engagement with the rear wheel of a wheelchair to lock the wheel against further rotation. The lever arm is also capable of being shifted to a reverse or non-locking position so that it moves the tab out of engagement with the wheelchair driving wheel and to a position where it cannot be engaged with the driving wheel to permit free-wheeling movement thereof. The brake device is constructed so that the tab is moveable to a non-interfering position where it is generally parallel to the plane of rotation of the wheel and is not likely to be contacted by the hand of a user. In one embodiment, the tab is manually moveable to the non-interfering position. In another embodiment, the tab is automatically moved to the non-interfering position when the lever arm is shifted away from the locking position.

23 Claims, 15 Drawing Figures

BRAKE DEVICE FOR WHEELCHAIRS

BACKGROUND OF THE INVENTION

1. Field of the Invention

This invention relates in general to certain new and useful improvements in brake devices for use with wheelchairs, and more particularly, to wheelchairs and brake devices used therewith which permit a brake arm to be shifted between locking and non-locking positions and having a brake tab carried thereby which is moveable to a position where it is out of the way of the hand of a user of the wheelchair.

2. Brief Description of the Prior Art

In recent years, there have been substantial changes in the design and construction of wheelchairs. Previously, wheelchairs were constructed of a box-like frame and normally adapted for transport of people with lower body disabilities. More recently, it has been realized that people with lower body disabilities, such as parapalegics, can engage in many sports activities, such as tennis, wheelchair racing, basketball and the like. Newer wheelchair designs, as for example, the wheelchairs of the type taught in U.S. Pat. No. 4,351,540 to Jeffrey P. Minnebraker, now have a lower center of gravity and are designed for quick movements. Further, these newer wheelchairs, which are of lighter weight, enable one to not only start and stop the wheelchair quickly, but to move the wheelchair at a relatively quick pace. This requires the hands of the user to constantly engage the hand ring on, typically, the rear wheels of the wheelchair for propelling the same. Since the user must constantly and quickly engage the hand rings to start and stop and propel the wheelchair, there must be no obstruction in the way which might contact the user's hand.

Generally, most wheelchairs provide a simple brake mechanism in which a brake tab is designed to be shifted into frictional locking engagement with a wheel of the wheelchair, as for example, a rear wheel, when a lever arm on the brake mechanism is shifted into a locking position. The tab can be removed from engagement with the wheel by shifting the hand engageable lever to another position when it is desired to permit the wheelchair to be propelled. In either case, the locking tab on the brake mechanism is typically located in a plane which is perpendicular to the plane of rotation of the wheel. Consequently, while the brake mechanism is desirable for use in normal transport, it may create an interference when the user of the wheelchair attempts to use the latter in sports activities, since it creates an obstruction and potentially resultant injury to the user of the wheelchair.

OBJECTS OF THE INVENTION

It is therefore a primary object of the present invention to provide a brake device which includes a brake locking tab capable of movement in a first path between the locking and non-locking positions and a second path angularly located to the first so that it is not likely to be contacted by a hand of a user.

It is another object of the present invention to provide an embodiment of a brake device of the type stated, which includes a wheel locking tab capable of being pivotally shifted in a first movement path to a wheel locking position or a non-locking position and which brake tab is also capable of movement in a second movement path to a position where it is generally parallel to a plane of rotation of the rear wheel of the wheelchair.

It is yet another object of the present invention to provide a brake device of the type stated in which the brake device is provided with a lever arm capable of shifting a locking tab between a locking position, a non-locking position and a neutral position and in which latter position the locking tab is capable of being shifted through a different movement path.

It is an additional object of the present invention to provide a brake device which includes a wheel locking tab capable of being pivotally shifted in a first movement path to a wheel locking position and a non-locking position and which brake tab is also automatically moveable in a second movement path to a position where it is not likely to be contacted by the hand of a user.

It is a further object of the present invention to provide a wheel brake device of the type stated which is highly efficient in its operation and designed to avoid injury to the hand of a user when a wheelchair is used in sports and related activities.

It is also an object of the present invention to provide a brake device for use with wheelchairs of the type stated which can be constructed at a relatively low cost.

It is a salient object of the present invention to provide a wheelchair construction which uses a brake device of the type stated.

It is still another object of the present invention to provide a brake device which can be included in new wheelchair constructions and which is capable of being fitted on existing wheelchairs.

With the above and other objects in view, our invention resides in the novel features of form, construction, arrangement and combination of parts presently described and pointed out in the claims.

BRIEF SUMMARY OF THE DISCLOSURE

A wheelchair brake device for use with wheelchairs. The brake device is constructed so that it can be relatively permanently included on new wheelchair constructions and which is also capable of being used on existing wheelchairs in place of conventional brake devices.

The wheelchairs for which the brake device is presently designed generally include a main frame and a seat structure for receiving the occupant of the wheelchair. These wheelchair constructions also employ a pair of rear wheels and a pair of front wheels. The rear wheels are typically of a substantially larger diameter and include hand rings near the periphery thereof for engaging and rotating the rear wheels and thereby propelling the wheelchair.

The wheel brake device of the present invention comprises a mounting braket for attachment to a portion of the main frame of the wheelchair. A "brake arm" which carries a brake tab is pivotally mounted with respect to this mounting means and is capable of being moveable from a wheel locking position where the brake tab may be in engagement with the wheel to a non-locking position where the brake tab is shifted through an arcuate path away from the wheel of the wheelchair, thereby permitting free wheeling movement of the wheel and hence the wheelchair.

The arcuate path of movement of the brake tab and of the brake arm is generally parallel with the plane of rotation of the rear wheels of the wheelchair. This is generally true even though the wheels may be slightly cambered. The wheel brake mechanism also comprises a pivot means which couples the tab to the brake arm so that the tab can be shifted in a different (second) plane or path of movement which is angulated and typically perpendicular to the first identified path of movement.

When the tab is in a first position, it is capable of being engaged with the wheel when the brake arm is shifted to the wheel locking position and away from the wheel when the brake arm is shifted to the non-locking position. Two presently preferred embodiments of the brake device are described in more detail hereinafter. The first of these brake devices enables the user to manually shift the brake tab to the second or so-called "retracted" or "up" position often referred to as the "non-interfering" position. In another embodiment, the brake tab is automatically shifted to the second position when the brake arm is moved away from the locking position.

In the first of the embodiments, when the brake arm is moved away from the locking position to a non-locking position the brake tab is capable of being shifted relative to the brake arm in the second path of movement to a non-interfering position so that the brake tab is not capable of engaging the wheel in locking engagement when the lever arm is moved to the locking position. In this latter condition, the brake tab is located parallel to the plane of rotation of the rear wheel of the wheelchair such that it is not likely to be engaged by a hand and particularly the thumb of the hand of a user in a fast action mode of operating the wheelchair.

The brake device also comprises a lever arm which is operatively coupled to he brake arm and is capable of being manually engaged for shifting the brake arm between the wheel locking position and the non-locking position as well as the neutral position. An intermediate arm is pivotally coupled to both the lever arm and to the brake arm and permits the lever arm to shift the brake arm to the desired position.

The brake device can be constructed so that there is a so-called "neutral" position intermediate the locking and non-locking positions. The various components of the device are constructed so that the brake tab can only be shifted up and down in the second path of movement when the lever arm and brake arm, and hence the brake device, is in the neutral position.

In a modified embodiment of the brake device, a spring means such as a torsion spring or torque spring is connected to the brake tab for automatically moving the same from the first position, such as the "down" position, to the second or "up" position. The torsion spring normally biases the brake tab to the upper or second position when the lever arm is moved to shift the device to the non-locking position. A camming surface on the lever arm moves the brake tab against the action of the torsion spring to the first or down position.

This invention possesses many other advantages and has other purposes which may be made more clearly apparent from a consideration of the forms in which it may be embodied. These forms are shown in the drawings forming part of and accompanying the present specification. They will now be described in detail for purposes of illustrating the general principles of the invention, but it is to be understood that such detailed descriptions are not to be taken in a limiting sense.

BRIEF DESCRIPTION OF THE DRAWINGS

Having thus described the invention in general terms, reference will now be made to the accompanying drawings in which:

DETAILED DESCRIPTION OF A PREFERRED EMBODIMENT

Referring now in more detail and by reference characters to the drawings which illustrate a practical embodiment of the present invention, W designates a wheelchair having a main frame 10 and a seat structure generally designated by reference numeral 12. The main frame 10 is comprised of at least a pair of spaced apart generally horizontally located longitudinally extending upper frame bars 14. In the embodiment as illustrated, the main frame 10 also comprises a pair of spaced apart lower generally horizontally located longitudinally extending frame bars 16. The remaining portions of the frame are conventional in construction and are therefore, not described in detail herein. The same holds true with respect to the seat structure 12.

Mounted on the forward ends of each of the lower frame bars 16 are a pair of front wheel assemblies 18. Further, and mounted on the rearward portion of the main frame 10 are a pair of rear wheel assemblies 20 comprising rims 22 having inflatable tires 24 and hand engagable rings 26 for engagement by the hands of a user to propel the wheelchair. The wheel assemblies and the means for mounting them to the wheelchair are also conventional.

Figure 1:
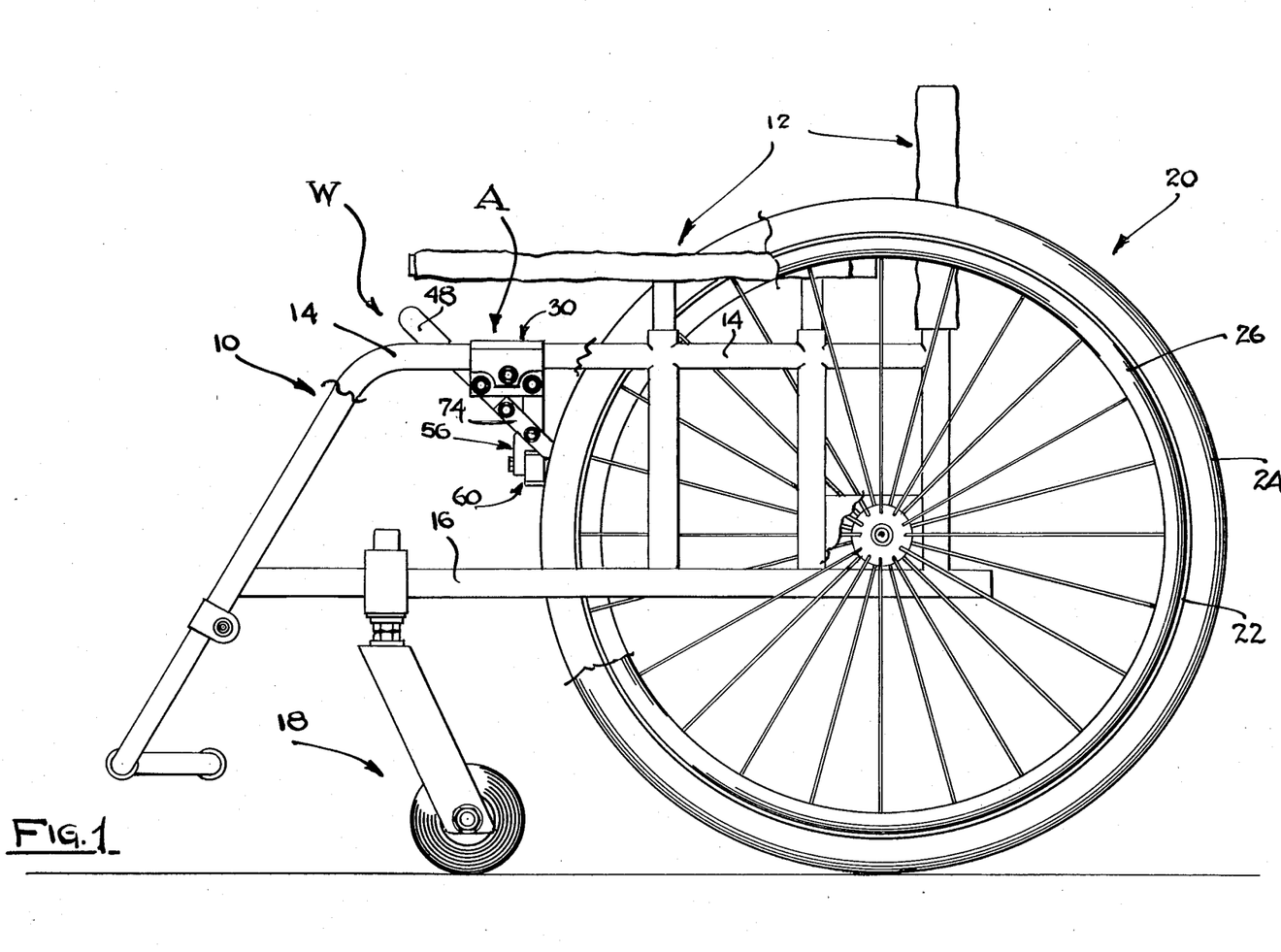
FIG. 1 is a side elevational view (partially broken away) of a wheelchair with a wheel brake device forming the subject matter of the present invention being mounted on and constituting a part of the wheelchair.

A wheel brake device A forming part of the present invention is shown as used on the wheelchair W in FIG. 1. This wheel brake device A is also more fully illustrated in FIGS. 2–10 of the drawings. The wheel brake device A generally comprises a brake mounting means such as a U-shaped bracket 30 for mounting the wheel brake device to the frame of the wheelchair. In this case, it can be observed that the bracket 30 which is of generally inverted U-shaped construction includes a first downwardly depending leg 32 and a second downwardly depending leg 34, the latter of which has a vertical depth less than that of the leg 32 and which are connected by a horizontal bight portion 36. A releasable bolt 38 extends through apertures in the legs 32 and 34 and is provided on its rear surface with a releasable nut 40. In this way, the mounting bracket 30 can be released from its position on a frame bar of the wheelchair and shifted to a different selected position. Furthermore, by merely releasing and partially removing the bolt 38, it is possible to easily and conveniently remove the entire brake device A from the wheelchair by lifting the bracket 30 off of the frame bar of the wheelchair.

Pivotally mounted on the depending leg 32 of the bracket 30 is an elongate lever arm 42 and which is retained by means of assembly of a bolt 44 and a nut 46. The bolt 44 effectively functions as a first pivot means, e.g. a pivot pin to permit the elongate lever arm 42 to be pivotal about the bolt 44. At its upper end, the lever arm 42 is provided with a hand grip 48 for engagement by a hand of a user. Also pivotally mounted on the leg 32 is a brake arm 50 and which is retained on the leg 32 by means of an assembly of a bolt 52 and a nut 54. In this case, again, the bolt 52 serves as a second pivot means, e.g. a pivot pin to permit the brake arm 50 to be pivotal with respect to the bracket 30. The brake arm 50 generally depends from the bracket 30 and includes a bifurcated lower end 56 comprised of a pair of spaced apart arm sections 58.

Figure 8:
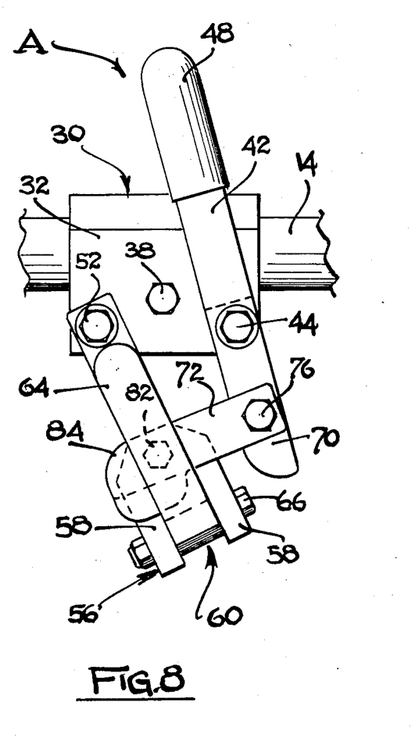
FIG. 8 is a side elevational view, similar to FIG. 7 and showing the brake tab forming part of the device shifted to the non-interfering position.
Figure 9:
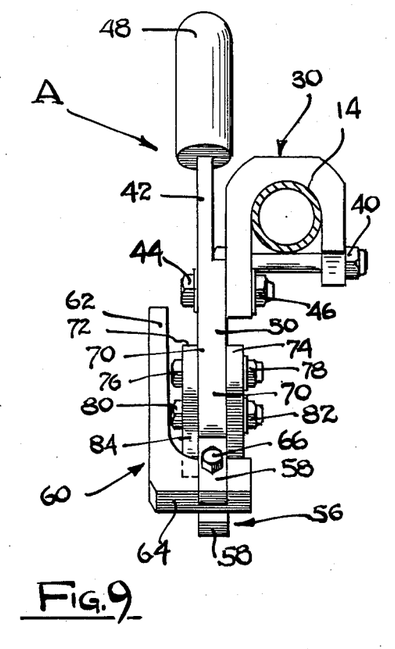
FIG. 9 is a front elevational view of the brake device and showing the brake tab in the non-interfering position.

Pivotally coupled to the bifurcated lower end 56 of the brake arm 50 is a brake lock member 60 which has an outwardly extending tab 62 and an integrally formed upwardly extending mounting arm 64. A pivot means in the form of a pivot pin 66, comprised of a bolt and nut assembly extends through the arm sections 58 and the mounting arm 64 to pivotally mount the brake lock member 60 to the bifurcated lower end of the brake arm 50. In this way, the brake tab 62 is pivotally mounted to the brake arm 50 such that it can lie in a first position where the brake tab 62 is perpendicular to the plane of rotation of the rear wheel 20. The brake tab 62 is also capable of being pivotally shifted to a second or so-called non-interferring position where it is generally parallel to the plane of rotation of the wheel. In this latter position, as illustrated in FIGS. 8 and 9, the brake tab 62 is in a plane parallel to the plane of rotation of the rear wheel of the wheelchair. The term "generally parallel" implies that the tab may be angulated away from a true parallel position with respect to the plane of rotation of the rear wheel, but only to an extent that it does not contact the wheel tire.

Figures 3, 4:
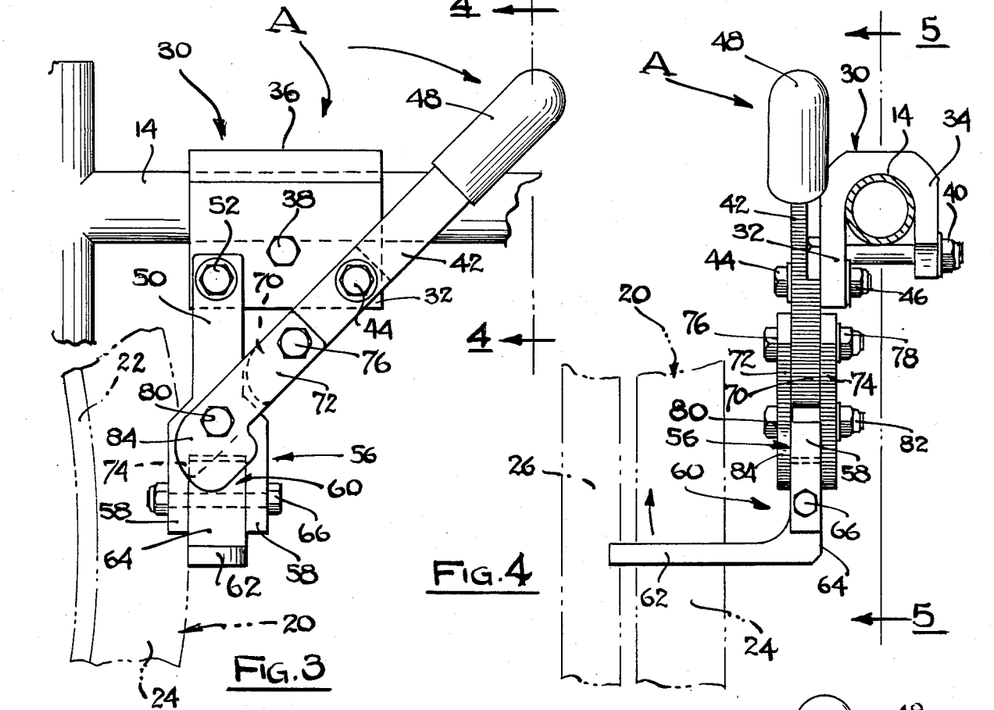
FIG. 3 is an enlarged side elevational view of the wheel brake device.
FIG. 4 is a front elevational view of the wheel brake device taken along the plane of line 4—4 of FIG. 3.
Figure 5:
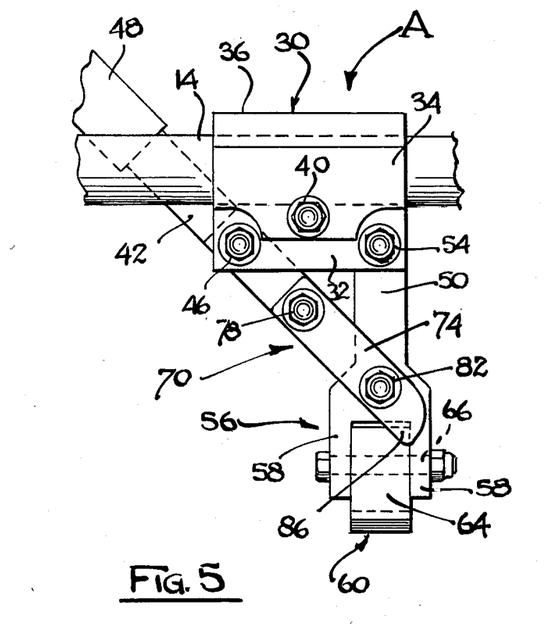
FIG. 5 is an opposite side elevational view, with respect to FIG. 3, and taken substantially along the plane of line 5—5 of FIG. 4.
Figure 6:
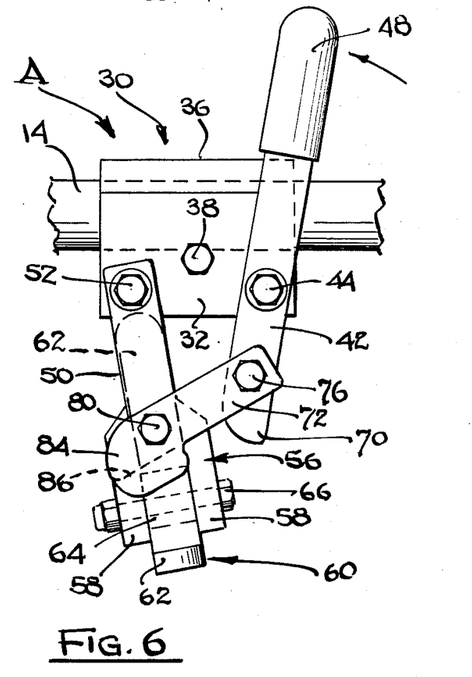
FIG. 6 is a side elevational view of the brake device, similar to FIG. 3 and showing the brake device in a neutral position.
Figure 7:
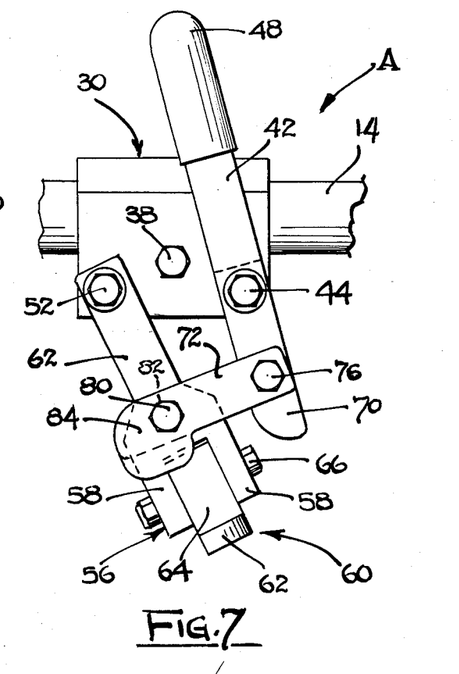
FIG. 7 is a side elevational view of the brake device, similar to FIG. 6 and showing the brake device in a non-locking position.
Figure 10:
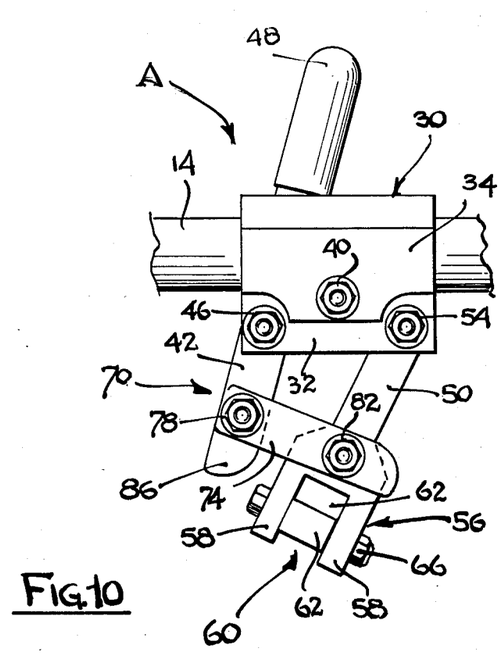
FIG. 10 is an opposite side elevational view, relative to FIG. 7 and showing the brake tab in the non-interfering position.

FIGS. 3–7 show the brake tab 62 in its first position and FIGS. 8–10 show the brake tab in its second position. FIG. 3 shows the brake device in the locking position with the brake tab in locking engagement against a rear wheel. FIG. 7 shows the lever arm and hence the brake device in a non-locking position. FIG. 6 shows the lever arm in a neutral position where it is in a position intermediate the locking and non-locking positions.

An intermediate arm assembly 70 interconnects the lever arm 42 and the brake arm 50. The intermediate arm assembly 70 actually comprises a first or outer intermediate arm 72 and an inner intermediate arm 74. The intermediate arm assembly 70 is pivotally connected to the lever arm 42 by means of an assembly of a bolt 76 and nut 78. In this case, the bolt 76 similarly functions as a pivot pin. The intermediate arm assembly 70 is also pivotally connected to the brake arm 50 by means of an assembly of a bolt 80 and a nut 82. Here again, the bolt 80 also functions as a pivot pin. The intermediate arm enables the lever arm to cause movement of the brake arm 50 in a manner to be hereinafter described in more detail.

Figure 2:
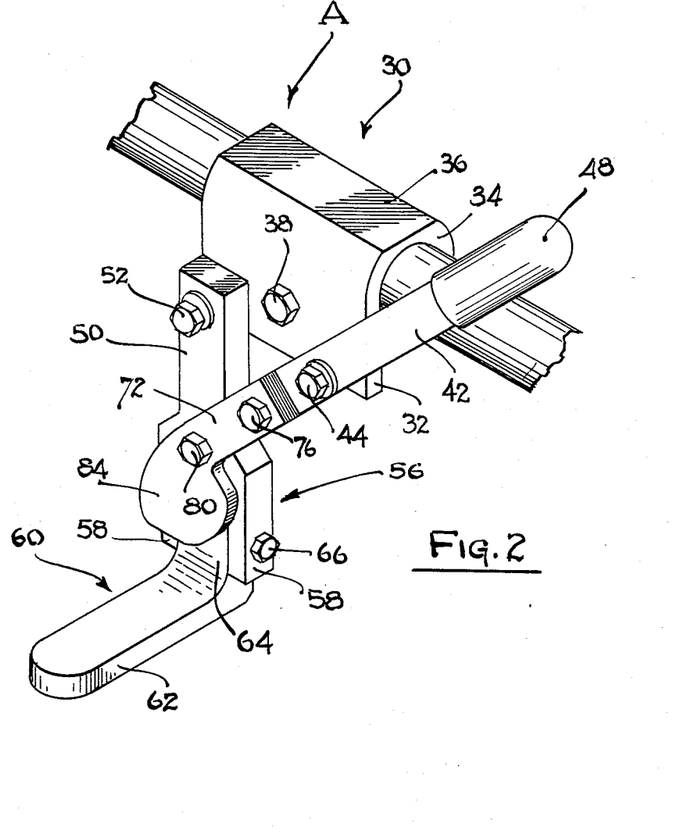
FIG. 2 is a perspective view of the wheel brake device forming a part of and embodying the present invention.

The outer intermediate arm 72 is integrally provided with an enlarged lobe 84 at its left-hand end, reference being made to FIGS. 2 and 6. This lobe is located so that when the locking tab 62 is in the first position, and the lever arm 42 is in the locking position, as illustrated in FIGS. 2 and 3, the locking tab 62 is prevented from being rotated upwardly toward the second or retracted position. A lower tip 86 of the rear intermediate arm 74 will engage the rear face of the arm 64 of the locking tab preventing movement to the second position, as best seen in FIG. 5.

The brake device heretofore described has a locking position where the brake tab 62 is engagable with the driving wheel and a non-locking position where the brake tab is displaced somewhat from the driving wheel. Thus, the brake device has two major positions, namely a locking position and a non-locking position. The brake tab can be rotated between the first and second positions when in the non-locking position. However, by constructing the intermediate arms 74 and 76 and lobe 84 with proper size and shape it is possible to provide a neutral position intermediate the locking and non-locking positions wherein the brake tab is shiftable in the second movement path when the brake device is in the neutral position, but cannot be moved between the first and second positions when the device is in the locking and non-locking positions.

The following is a description of one mode of operation of the wheel brake device of the present invention. The lever arm 42 is capable of shifting the brake arm 50 to a so-called "locking position", that is, a position where the brake tab 62 is capable of engaging the tire 24 of a wheelchair. In this locking position, the brake arm 50 is generally vertically disposed and the locking tab 62 is generally located in a horizontal plane and is perpendicular to the plane of rotation of the rear wheel assembly 20. In this way, the locking tab section 62 can engage the tread on the tire 24 and prevent the latter from rotating.

By further reference to FIGS. 3 and 4 of the drawings, it can be observed that when the lever arm 42 has been shifted to the locking position, the lever arm 42 will also be aligned with the intermediate arm assembly 70 including both the outer arm 72 and the inner arm 74. By reference to FIGS. 3 and 5 it can be observed that three pivot points, e.g. 44, 76 and 80 are aligned in a straight line which precludes any force against the tab 62 moving the same away from the locking position. In this way, there is a positive locking action which holds the brake locking tab 62 into engagement with the tire 24 on the wheel assembly. This locking action is effectively only released when the lever arm 42 and brake arm 50 are moved away from the locking position. If there is a slight over-center e.g., a slight acute angle between the lower edges of the lever arm 42 and intermediate arms 72 and 74 with a resultant obtuse angle at the upper edges thereof, a so-called "over the center" positive locking action can be achieved. Further, when the device is in the locking position, the intermediate arm will hold the brake lock member 60 in the down position. The interior face of the enlarged lobe 84 will overlie the exterior face of the arm 64 providing stabilization in the first position.

The lever arm 42 is also capable of being shifted to a "non-locking" position, as more fully illustrated in FIG. 7. In this position, the lever arm 42 pulls the brake arm 50 away from the wheel assembly 20. Further, and by reference to FIG. 8, it can be observed that the locking tab 62 is removed from engagement with the tire 24 on the wheel assembly. This permits free wheeling movement of the wheelchair.

In essence, the lever arm 42 is capable of moving the locking tab between three different positions. The first position is the locking position as illustrated in FIGS. 2–5 such that the tab 62 is capable of engaging the tire on a wheelchair wheel. The lever arm 42 is also capable of shifting of the brake lock member 60 to a non-locking position, as shown in FIG. 8 where the wheelchair is capable of free wheeling movement. Finally, when the components are properly sized and shaped, the lever arm 42 is capable of shifting the brake locking member 60 to a position where the tab 62 is intermediate the locking position and the non-locking position. In this latter or neutral position, the locking tab 62 can be shifted from its first position independently of the positions established by the lever arm from a first position as shown in FIG. 2 to a second or non-interferring position as shown in FIGS. 8–10. In this way, the locking tab 62 is capable of moving between three different positions by virture of actuation of the lever arm 42 and in addition is capable of shifting between a first and second position independently of the lever arm 42.

It can be observed that the wheel brake device of the present invention is highly effective for use on wheelchairs when the latter are used for normal transport of a handicapped individual. In essence, the user can lock the wheelchair in a desired position or slow the movement of the wheelchair by merely pushing on the lever arm 42 to urge the same toward the locking position. Further, this wheel brake device is also highly effective in that the locking tab, which could otherwise result in thumb and hand injuries, can be shifted out of the way so that the wheelchair can be used in various sports activities.

FIGS. 11–14 illustrate a modified form of brake device B which is constructed in accordance with and embodies the present invention. This brake device B is similar to the brake device A, except that the locking tab automatically moves to the non-interfering position as the lever arm is moved away from the locking position toward the neutral or non-locking position. In this embodiment of the brake device, like reference numerals used in the description of the brake device A will be applied to common components in the brake device B.

Figure 14:
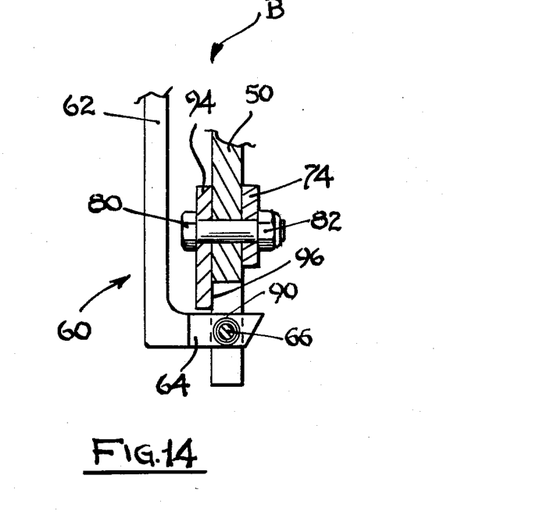
FIG. 14 is a vertical sectional view similar to FIG. 13 and showing the brake locking tab moved still further to its upper or non-interfering position.

The brake lock member 60 is pivotally connected to the lower end of the brake arm 50 through the pivot pin 66. Further, a biasing means in the form of a torsion spring 90 is concentrically disposed about the pivot pin 66 and has an end section 92 which engages or is otherwise secured to some rigid component, such as the bifurcated end of the brake arm 50. The torsion spring 90 has another end 93 connected to the brake lock member 60 in such manner that it normally biases the brake lock member 60 to its upper or non-interfering position as shown in FIG. 14. Thus, when the lever arm 42 is shifted toward the non-locking position, the lower tip 86 of the intermediate arm 76 in moved out engagement with the rear surface of the arm 64 and there is no other component which interferes with the spring 90 biasing the locking tab to its upper or non-interfering position. Thus, the locking tab 62 will automatically move upwardly to the non-interfering position as shown in FIG. 14.

Figure 13:
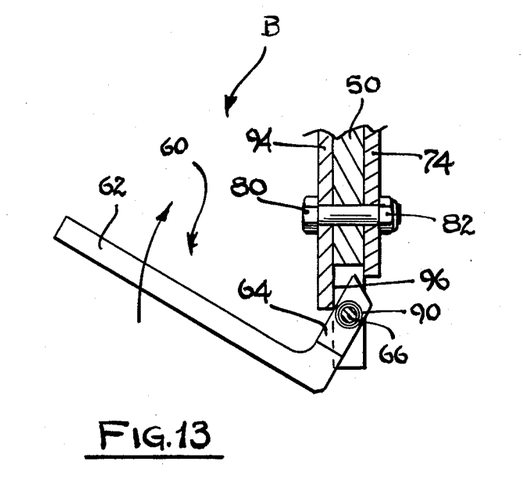
FIG. 13 is a vertical sectional view similar to FIG. 12 and showing a brake locking tab in a position where it is moved upwardly.

When the user of the device wishes to lock the wheel, the lever arm 42 is moved toward the locking position. At its lower end, the lever arm 42 carries a camming plate 94 with a lower and inwardly presented camming edge 96. It can be observed that this camming edge 96 engages the outer face of upwardly extending mounting arm 64 and bears against the same and against the force of the torsion spring 90 so that the lever arm is moved downwardly, as shown in FIG. 13. Further movement of the brake lock member 60 toward the locking position causes further movement of the brake tab to the first position as shown in FIG. 12.

This latter embodiment of the brake device otherwise operates in substantially the same way as the brake device A. However, it has been found to be highly effective in automatically moving the brake tab from the first position to the non-interfering position when not in the locking position so that it is never in the way of the hand of the user of the apparatus.

Figures 11, 12, 15:
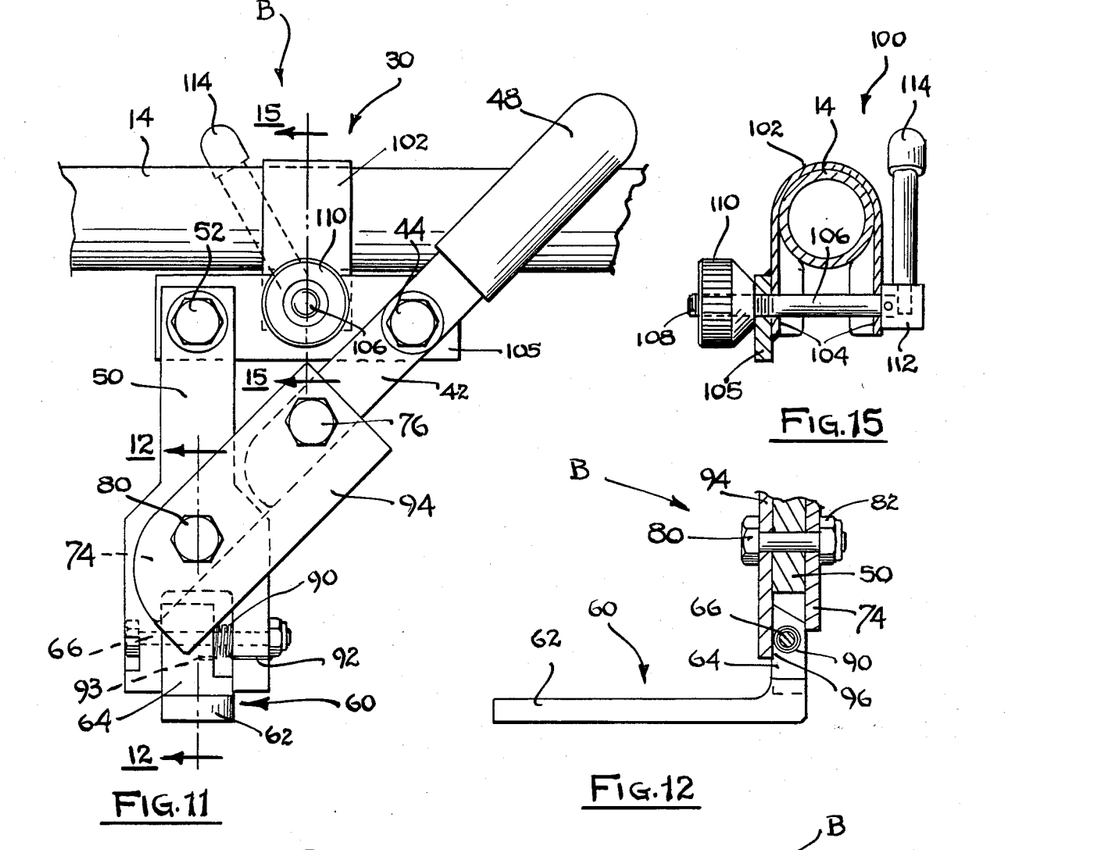
FIG. 11 is a side elevational view of a modified form of brake device constructed in accordance with and embodying the present invention.
FIG. 12 is a fragmentary vertical sectional view taken along line 12—12 of FIG. 11.
FIG. 15 is a vertical sectional view taken along line 15—15 of FIG. 11.

It is also possible to provide a quick release mounting mechanism 100 on the brake device of the present invention, as shown in FIG. 15. The quick release mechanism 100 comprises a generally inverted U-shaped band clamp 102 having depending lower ends 104 and which is adapted to extend over one of the frame bars 14, forming part of the wheelchair. A depending plate 105 is welded or otherwise rigidly secured to one of the lower ends 104 and serves as a mounting plate for the lever arm 42 and brake arm 50. A bolt 106 having a threaded end 108 extends through each of the lower ends 104. On one end a nut 110 is threaddedly secured to the threaded end 108. At its opposite end a fitting 112 having an outwardly extending arm 114 is rigidly secured to the bolt 106.

In accordance with this construction, the user of the device can easily release the tightening action of the bolt and nut against the lower ends 104 of the band clamp 102 and permit the lock device to be positioned at an appropriate position on the frame of the wheelchair. This is highly effective where the wheelchair is of the type having positionable rear wheels. Further, while the quick release mounting mechanism 100 has been shown for use with the brake device B of FIGS. 11–14, it should be understood that the device is equally effective with the brake device A shown in FIGS. 1–10.

Thus, there has been illustrated and described a unique and novel brake device for wheelchairs which is operable with a wheel engaging tab capable of being shifted into engagement with a wheel in normal operation and capable of being shifted to a position where it is incapable of engaging a wheel of a wheelchair and not likely to be contacted by a hand of a user. Thus, the present invention fulfills all of the objects and advantages sought therefore. It should be understood that many changes, modifications, variations, and other uses and applications will become apparent to those skilled in the art after considering this specification and the accompanying drawings. Therefore, any and all such changes, modification, variations, and other uses which do not depart from the spirit and scope of the invention are deemed to be covered by the invention which is limited only by the following claims.

Having thus described our invention, what we desire to claim and secure by Letters Patent is:

1. A wheel brake device for use with a wheelchair, said brake device comprising:
   (a) brake mounting means for mounting the brake device to a frame of a wheelchair,
   (b) a brake arm pivotally mounted with respect to said mounting means and capable of being pivotally moveable with respect thereto from a wheel locking position to a non-locking position,
   (c) a wheel engaging tab carried by said brake arm and capable of engaging a wheel of a wheelchair in a wheel engaging position to prevent rotation of same when said brake arm is in a locking position and not engaging said wheel when the brake are is in a non-locking position, said wheel engaging tab having a flange thereon which is angularly disposed to the tab and which is moveable therewith and which angularly disposed flange has a cam receiving surface thereon,
   (d) pivot means coupling said tab to said brake arm so that said tab can be shifted to a first position where it is generally perpendicularly disposed to the plane of rotation of the wheel and capable of being engageable with the wheel when the brake arm is shifted to the wheel locking position, and to a second, non-interferring position in which said tab is located in a plane where it is generally parallel to and displaced from the plane of rotation of the wheel and cannot engage said wheel and is not likely to be contracted by a hand of a user when the brake arm is in the wheel locking position,
   (e) lever means operatively coupled to said brake arm and capable of being manually engaged for shifting said brake arm between the wheel locking position and the non-locking position, and
   (f) a cam on the end of said lever means and engaging said cam receiving surface of said flange on the tab to force said tab into the wheel engaging position when the brake arm is moved to the locking position and enabling said locking tab to be moved to the non-interfering position when said brake arm is moved to the non-locking position.

2. The wheel brake device of claim 1 further characterized in that said lever means is connected to said brake arm by an intermediate arm pivotally connected to said lever means and pivotally connected to said brake arm.

3. The wheel brake device of claim 2 further characterized in that said brake arm is pivotally mounted on said brake mounting means.

4. The wheel brake of claim 3 further characterized in that said lever means is also pivotally mounted on said brake mounting means.

5. The wheel brake device of claim 4 further characterized in that said brake mounting means is a clamp disposed on a frame bar of a wheelchair frame and being retained in a desired position thereon.

6. The wheel brake device of claim 1 further characterized in that said wheel engaging tab is parallel to the axis of rotation of the wheel and generally perpendicular to the plane of rotation of the wheel in the first position, and is approximately parallel to the plane of rotation of the wheel and approximately perpendicular to the axis of rotation of the wheel in the second position.

7. The wheel brake device of claim 1 further characterized in that pivot means connects the wheel engaging tab to the brake arm, and a biasing means normally biases the tab to the second position.

8. The wheel brake device of claim 7 further characterized in that said cam is located to move the tab to the first position against the action of the biasing means when the brake arm is moved to the locking position.

9. The wheel brake device of claim 8 further characterized in that the biasing means is a torsion spring.

10. The wheel brake device of claim 1 further characterized in that said mounting means comprises a quick-release mounting means having a member manually shifted through a relatively small distance to retain and release said brake device from a fixed position on a wheelchair.

11. A wheel brake device for use with a wheelchair, said wheel brake device comprising:
   (a) a brake mounting means for mounting to a wheelchair,
   (b) an elongate brake arm pivotally mounted to said brake mounting means and extending beyond said mounting means and capable of movement in a first path between a locking position and a non-locking position,
   (c) an elongate lever arm pivotally mounted to said brake mounting means and also extending beyond this mounting means,
   (d) a handle portion on one end of said lever arm for engagement by a user to shift said lever arm,
   (e) an intermediate arm pivotally connected to said brake arm and pivotally connected to said lever arm, said intermediate arm capable of moving said brake arm to the locking position with respect to a wheel on the wheelchair in response to movement of the lever arm to a locking position and moving said brake arm to the non-locking position with respect to said wheel in response to movement of the lever arm to a non-locking position, said lever arm and intermediate arm each having central longitudinal axes which are aligned when the lever arm is moved to the locking position to create a pivotal dead center locking action,
   (f) a locking tab pivotally mounted on said brake arm and capable of being shifted from a wheel engagable position in a plane generally perpendicular to the plane of rotation of a wheel on the wheelchair where it can engage said wheel when the brake arm is in the locking position, to a non-interferring position when it is shifted to a plane where it cannot engage said wheel, said locking tab having a flange thereon which is angularly disposed to the tab and which is movable therewith and which angularly disposed flange has a cam receiving surface thereon, and
   (g) a cam on the end of said intermediate arm and engaging said cam receiving surface of said flange on the locking tab to force said locking tab into the wheel engageable position when the lever arm is moved to the locking position and enabling said locking tab to be moved to the non-interfacing position when said lever arm is moved to the non-locking position.

12. The wheel brake device of claim 11 further characterized in that a first pivot pin pivotally connects the intermediate arm to the brake arm, and a second pivot pin pivotally connects the intermediate arm to the lever arm.

13. The wheel brake device of claim 12 further characterized in that a third pivot pin pivotally connects said locking tab to said brake arm.

14. The wheel brake device of claim 13 further characterized in that said brake arm has a bifurcated end and said third pivot pin pivotally connects the angularly disposed flange of the locking tab to the bifrucated end of said brake arm.

15. The wheel brake device of claim 11 further characterized in that said cam on the end of said intermediate arm is an enlarged cam-shaped end adjacent the pivotal connection to said brake arm, said enlarged cam-shaped end preventing said tab from being shifted to the non-interferring position when the brake arm is in the locking position.

16. The wheel brake device of claim 15 further characterized in that a second intermediate arm is associated with the first intermediate arm and prevents the tab from being shifted to the non-interferring position when the brake arm is in the locking position.

17. The wheel brake device of claim 11 further characterized in that pivot means connects the tab to the brake arm, and a biasing means normally biases the tab to the non-interfering position.

18. The wheel brake device of claim 17 further characterized in that said cam is located to move the tab to the wheel engageable position against the action of the biasing means when the brake arm is moved to the locking position.

19. The wheel brake device of claim 18 further characterized in that the biasing means is a torsion spring.

20. A wheel brake device for use with a wheelchair, said brake device comprising:
 (a) brake mounting means for mounting the brake device to a wheelchair,
 (b) a brake arm pivotally mounted with respect to said mounting means and capable of being pivotally moveable to and away from a wheel locking position,
 (c) a wheel engaging tab carried by said brake arm and capable of engaging a wheel of a wheelchair to prevent rotation of same when said brake arm is in a locking position and not engaging said wheel when the brake arm is in a non-locking position and not engaging said wheel when the brake arm is moved away from the locking position,
 (d) pivot means coupling said tab to said brake arm so that said tab can be shifted to a first position where it is generally perpendicularly disposed to the plane of rotation of the wheel and capable of being engagable with the wheel when the brake arm is shifted to the wheel locking position, and to a second position in which said tab is located in a plane generally parallel to and displaced from the plane of rotation of said wheel when the brake arm is shifted away from the locking position and is not likely to be contacted by a hand of a user when the brake arm is not in the locking position,
 (e) biasing means operatively associated with said tab for automatically biasing said tab to the second position when said brake arm is moved away from the wheel locking position,
 (f) a lever arm operatively connected to said brake arm for moving the brake arm to and away from the wheel locking position, and
 (g) a cam operatively mounted on the end of said lever arm and engaging a cam receiving surface of said tab to force said tab into the first position when the lever arm is moved to the locking position and enabling said tab to be moved to the second position when said lever arm is moved away from the locking position.

21. The wheel brake device of claim 20 further characterized in that said lever arm is connected to said brake arm by an intermediate arm pivotally connected to said lever arm and pivotally connected to said brake arm.

22. The wheel brake device of claim 20 further characterized in that said wheel engaging tab is located in the first position where it is parallel to the axis of rotation of the wheel, and in the second position which is approximately perpendicularly disposed to the first position so that it is approximately parallel to the plane of rotation of the wheel and approximately perpendicular to the axis of rotation of the wheel.

23. The wheel brake device of claim 20 further characterized in that said mounting means comprises a quick-release mounting means having a member manually shifted through a relatively small distance to retain and release said brake device from a fixed position on a wheelchair.

* * * * *